US010129671B2

(12) United States Patent
Krause et al.

(10) Patent No.: US 10,129,671 B2
(45) Date of Patent: Nov. 13, 2018

(54) HEARING DEVICE ADJUSTMENT BASED ON CATEGORICAL PERCEPTION

(71) Applicants: Lee Krause, Indialantic, FL (US); Rahul Shrivastav, East Lansing, MI (US)

(72) Inventors: Lee Krause, Indialantic, FL (US); Rahul Shrivastav, East Lansing, MI (US)

(73) Assignee: Securboration, Inc., Melbourne, IL (US)

( * ) Notice: Subject to any disclaimer, the term of this patent is extended or adjusted under 35 U.S.C. 154(b) by 318 days.

(21) Appl. No.: 14/188,393

(22) Filed: Feb. 24, 2014

(65) Prior Publication Data

US 2014/0241537 A1 Aug. 28, 2014

Related U.S. Application Data

(60) Provisional application No. 61/768,108, filed on Feb. 22, 2013.

(51) Int. Cl.
*G10L 15/08* (2006.01)
*H04R 25/00* (2006.01)

(52) U.S. Cl.
CPC .................................... *H04R 25/70* (2013.01)

(58) Field of Classification Search
CPC ......... G10L 15/00; G10L 15/04; G10L 15/08; G10L 15/187
USPC ........ 704/250, 236, 248, 249, 253, 254, 255
See application file for complete search history.

(56) References Cited

U.S. PATENT DOCUMENTS

| | | | | | |
|---|---|---|---|---|---|
| 5,884,260 | A * | 3/1999 | Leonhard | G10L 15/02 | 704/211 |
| 2007/0129772 | A1 * | 6/2007 | Loeb | A61N 1/36036 | 607/57 |
| 2010/0232613 | A1 * | 9/2010 | Krause | A61N 1/08 | 381/60 |
| 2010/0246837 | A1 * | 9/2010 | Krause | G10L 15/00 | 381/58 |
| 2010/0299148 | A1 * | 11/2010 | Krause | G10L 25/69 | 704/237 |
| 2012/0233003 | A1 * | 9/2012 | Calman | G06Q 30/06 | 705/16 |

* cited by examiner

*Primary Examiner* — Qi Han
(74) *Attorney, Agent, or Firm* — Danielson Legal LLC

(57) ABSTRACT

Hearing device configuration and hearing treatment using categorical perception; systems and methods for categorical perception based configuration of hearing devices and hearing treatment.

12 Claims, 5 Drawing Sheets

HEARING DEVICE ADJUSTMENT BASED ON CATEGORICAL PERCEPTION

CROSS-REFERENCE TO RELATED APPLICATIONS

The present application claims the benefit of co-pending U.S. provisional application No. 61/768,108, filed on Feb. 22, 2013, the entire disclosure of which is incorporated by reference as if set forth in its entirety herein.

FIELD OF THE INVENTION

The present invention relates to hearing device adjustment, and in particular to adjustment techniques that take advantage of the cognitive phenomenon of categorical perception.

BACKGROUND OF THE INVENTION

The ability to determine an individual's speech perception automatically, rapidly and remotely results in improved hearing device performance, dramatic cost-savings, and greater accessibility to hearing health care for patients who cannot afford it or for those who lack easy access to the necessary expertise.

Many traditional methods for fitting a hearing device are based on sophisticated gain models utilizing average perception, performance, and preference data. The use of such methods falls short in that they cannot correctly tailor the performance of the hearing device to the individual without the direct involvement of a hearing professional. In addition, methods that are based on a patient's subjective inputs can lead to inaccurate fitting of a hearing device which leads to a high cost to fit the device and a low acceptance rate.

SUMMARY OF THE INVENTION

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

One object of the invention is to use automated, real-time, speech-based testing to determine the hearing device, such as a hearing aid, (HA) parameter settings that maximize speech intelligibility for each individual user. This testing provides the benefits of individualized fitting and improved outcomes for speech intelligibility while moving toward a fully automated fitting.

In one aspect the invention relates to a system for tuning a hearing device. The system includes a transmitter for sending a signal to an observer, a receiver for receiving a response from the observer, and an adjustment module for adjusting the signal. The observer perceives the transmitted signal as being in a phonemic category and provides a response indicating the phonemic category of the signal perceived by the user. The adjustment module varies the signal to elicit a response from the observer indicating a change in observer's categorical perception of the signal. The categorical perception may be evaluated through a change in the perceived phonemic category of the signal.

In one embodiment, the signal includes phoneme or word continua. Those continua may be generated using low-distortion speech synthesis. The continua may include stimuli that vary in the time domain, stimuli that vary in the frequency domain, voice onset time, spectral center of gravity, stop burst frequency, spectral slope, duration, rise time, spectrum moments, fall time, signal-to-noise ratio, spectral characteristics, waveform characteristics, etc., and combinations of the foregoing.

In one embodiment, the adjustment module varies the signal using selective amplification. The adjustment module may vary the signal by, e.g., varying a parameter from the frequency domain, varying a parameter from the time domain, changing compression characteristics, changing the signal-to-noise ratio, and selectively amplifying signal characteristics.

In one embodiment, the system includes an interface that transmits to a hearing device (such as a hearing aid, an implanted hearing device, a telephone, a wireless radio, a Bluetooth-equipped audio device, etc.) parameters determined at least in part by the adjustments of the signal made by the adjustment module. Those parameters may include gain, compression knee-points, compression ratios, time constraints, etc. The parameters may be determined using, e.g., an optimization algorithm applied to the adjustments of signal made by the adjustment module. Exemplary optimization algorithms include constraint-based reasoning, machine learning, graph theory, and ensemble learning.

In one embodiment, the system includes a processor configured to identify the observer's categorical perception boundaries based on at least one response from the observer.

In another aspect the invention relates to a method for tuning a hearing device. A signal is presented to an observer who perceives the signal as belonging to a phonemic category. A response is received from the observer that indicates the phonemic category for the signal perceived by the user. The signal is adjusted to elicit a response from the observer indicating a change in the categorical perception of the signal. In one embodiment, the method includes identifying the observer's categorical perception boundaries based on at least one response from the observer. In one embodiment, the method includes configuring a hearing device using, at least in part, the identified categorical perception boundaries for the observer.

In another aspect the invention relates to a method for hearing treatment utilizing categorical perception. At least one signal is presented to an observer. At least one response to the at least one presented signal is received from the observer. A model of the observer's hearing is developed based at least in part on the at least one received response. The observer's hearing is changed using a technique responsive to the developed model, wherein the technique is at least one of a behavioral training regime, a pharmacological treatment, a surgical intervention, and an adjustment to a hearing device.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following Figures in which.

In the drawings, like reference characters generally refer to corresponding parts throughout the different views. The drawings are not necessarily to scale, emphasis instead being placed on the principles and concepts of operation.

DETAILED DESCRIPTION OF THE INVENTION

Figure 1:
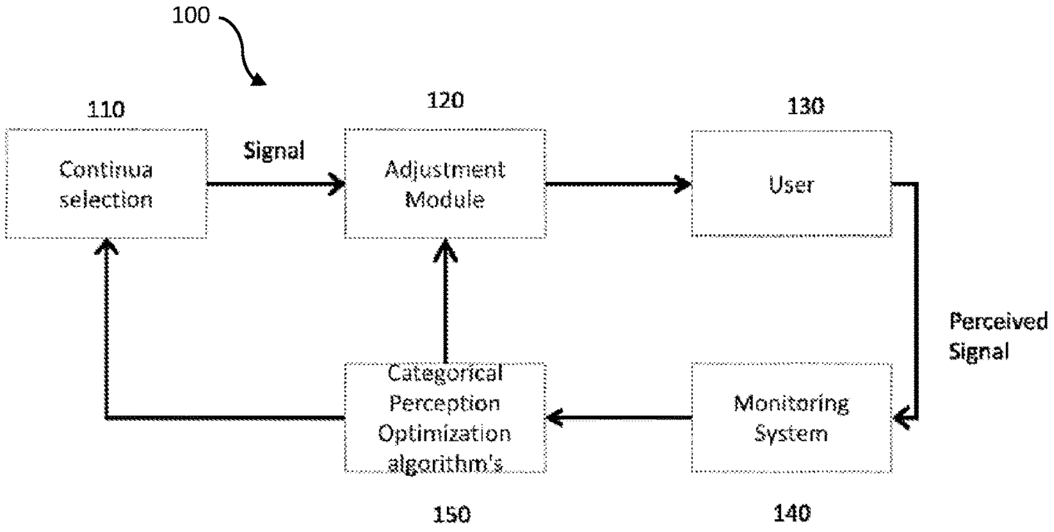
FIG. 1 is a block diagram illustrating one embodiment of an operating environment for optimizing a hearing device using categorical perception.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Embodiments of the present invention generally relate to optimization of hearing devices (such as a hearing aid, an implanted hearing device, a telephone, a wireless radio, a Bluetooth-equipped audio device, etc.) using categorical perception. Existing techniques for hearing device optimization are based on statistical averages used to determine gain setting in the hearing device or user preferences which lack scientific bases. Current techniques that leverage performance metrics tend to require a significant time to reach optimization which is not practical for the majority of the hearing industry. These issues lead to a large underserved population of hearing users. The hearing industry has been trying to develop ways to service the large population that could benefit from a hearing instrument but choose not to wear one due to cost, performance, or access to healthcare. The embodiments described herein include systems and methods for categorical perception based optimization that provide better patient outcomes in less time than traditional fittings. In turn, the time required to and cost to optimize a hearing device will be reduced.

Individual variability in audiometric thresholds does not capture the variability in speech intelligibility at suprathreshold levels or in noise. Yet, the complexity of the speech signal, the multidimensional and non-linear nature of speech perception, and the large individual differences across listeners make it difficult to develop signal processing strategies based on speech stimuli. The proposed approach solves these problems via three innovative elements described below: (1) a novel optimization metric based upon each listener's performance on a series of categorical perception tasks, (2) optimization algorithms based on AI algorithms, and (3) development and incorporation of an evolving graph-theory knowledge base.

An optimization method based on real-time identification and analysis of "distinctive features" errors from phoneme recognition would work well for cochlear implant (CI) fittings but is not ideal for HA fitting. It would typically be too time consuming and too tailored to perceptual difficulties of CI patients. HA patients typically perform at ceiling on phoneme recognition in quiet while tests of speech intelligibility in noise are primary HA outcome measures.

To avoid these issues, a new optimization metric more appropriate for HAs based on categorical perception in noise is selected. While categorical perception has been used to promote the "motor theory" of speech perception, it forms a more general principle of sensory perception across multiple modalities that can be modeled mathematically. In speech, small changes along an acoustic continuum can result in a shift in perceived phonemic category (e.g., gradual reduction of voice onset time (VOT) of /p/ results in a sudden perceptual shift to /b/). Mapping acoustic continua to discrete phonemic categories is a component of speech understanding. Categorical boundaries differ for listeners with normal hearing (NH) and sensorineural hearing loss (SNHL) and selective amplification of the input shifts these boundaries for hearing impaired (HI) listeners towards those of NH listeners. Selective alteration of frequency-specific gain can improve speech discrimination despite constant signal to noise ratio in that channel. Categorical perception can be used to quantify speech recognition difficulties and used to optimize HA output that maximizes speech intelligibility for individual listeners. Accordingly, in certain embodiments of the present invention, the goal is to determine the digital signal processor (DSP) parameters that effectively normalize the categorical perception of HI listeners, either individually or on average, to that of NH listeners, thereby achieving HA performance that maximizes speech intelligibility in the presence of noise.

Once the signal processing parameters (e.g., gain, compression knee-points, compression ratios, time constants, etc., in each channel) that normalize categorical perception for an individual listener are determined, then a set of optimization algorithms using (1) artificial intelligence (AI) approaches such as those based on constraint-based reasoning machine learning, (2) graph theory, and (3) ensemble learning will be used.

As discussed in greater detail below, constraint-based reasoning machine learning works by providing sets of device parameters that allow rapid determination of the categorical perception points for each continua pair by modeling the combinatorial complexity. This approach combines device parameters and categorical perception models to determine initial system constraints that will evolve based on the user performance. The second algorithm will leverage graph theory to develop a knowledge base that identifies similar patient patterns that can be used to predict future device settings. This data mining algorithm will search for relationships between HA parameters and available behavioral data and patient characteristics to develop broad rules that constrain optimization. Since the accuracy and utility of this knowledge base will increase as access data increases. The third algorithm will leverage ensemble learning, an offshoot of Bayesian probability, to support the merging of multiple models.

Combining these three models, the constraints obtained for each continuum pair provides optimally weighted device parameter values that support normalized categorical perception for each continuum. Instead of the average data used in traditional fitting, parameter value selection is based on empirical data derived from the performance of each patient with no a priori assumptions. The resulting HA fit is custom designed for each individual user providing maximum benefit to that user.

FIG. 1 illustrates an operating environment 100 for hearing device optimization using categorical perception as the metric of optimization according to one or more embodiments. As shown in FIG. 1, the operating environment 100 may include a generator for continua selection 110, an adjustment module 120, a user 130 interacting with the operating environment 100, a monitoring system 140, and categorical perception optimization algorithms 150. These components may be performed by hardware, software, or a combination of hardware and software.

The continua generator 110 creates phoneme continua consisting of high-fidelity synthesized test stimuli. Generated continua include but are not limited to any continua pair and/or any combination of continua, for example, VOT (e.g., /p/-/b/, /t/-/d/), spectral center of gravity (e.g. variation of stop burst frequency for /k/-/t/, /t/-/p/), spectral slope (e.g. /s/-/ʃ/), and duration and rise-time (e.g. /t/-/tʃ/). The phoneme continua will be generated using low-distortion speech synthesis to evaluate categorical perception for multiple acoustic cues that are known to be critical for speech perception.

The adjustment module 120 adjusts the continua in the frequency or time domain to alter the signal to improve the user perception of the continua signal from generator 110. These adjustments include changes in (i) VOT, (ii) spectral center of gravity, (iii) spectral slope, and (iv) rise-time. In one embodiment (not shown), the functionality of the continua generator 102 and the adjustment module 120 are combined in a single component.

User 130 may interact with an interface (e.g., a GUI) that allows the user to quickly determine the breakpoint associated with a continua (for example, 'p' to 'b'). This can be achieved through sliders that determine the stimulus being sent, i.e., allowing the user to adjust the stimulus in one or more aspects until the user perceives a categorical change in the stimulus being sent, in which case the breakpoint for those particular categories is identified. The breakpoint can also be identified using a "same-different" sound test, where a user is presented with pairs of sounds that are intended to fall into different categories on either side of a suspected breakpoint; by progressively altering the pairs and asking the user to identify whether those pairs sounds similar or different, a breakpoint can thereby be identified. Breakpoints can also be identified using an "enter the sound you hear" test, where the user is prompted to identify the category for a presented sound; by varying the sounds around a suspected breakpoint, the user's particular breakpoint can be identified. In another embodiment, the user could directly interact with the hearing aid through speech recognition or buttons to denote the breakpoint.

Monitoring system 140 analyzes the user's perceived signal results (e.g., breakpoints) as compared to the signal results expected of a normal listener to determine the issues in the time and frequency domains that are affecting the user. For example, the monitoring system 140 may be used to determine the change in gain or frequency at which a particular breakpoint may occur for the user 130.

The optimization routines 150 will use performance on the categorical perception tasks processed by the monitoring system to determine the best hearing device settings for an individual user 130. The categorical perception results for all the continua presented to the user 130 will be used to determine the hearing device parameters that normalize categorical perception for the user 130 across all the presented continua. For example, if the user 130 is unable to clearly discriminate 'sh' from 's', one potential solution determined by the optimization routines 150 would be to increase the high frequency gain of the hearing device.

Figure 2:
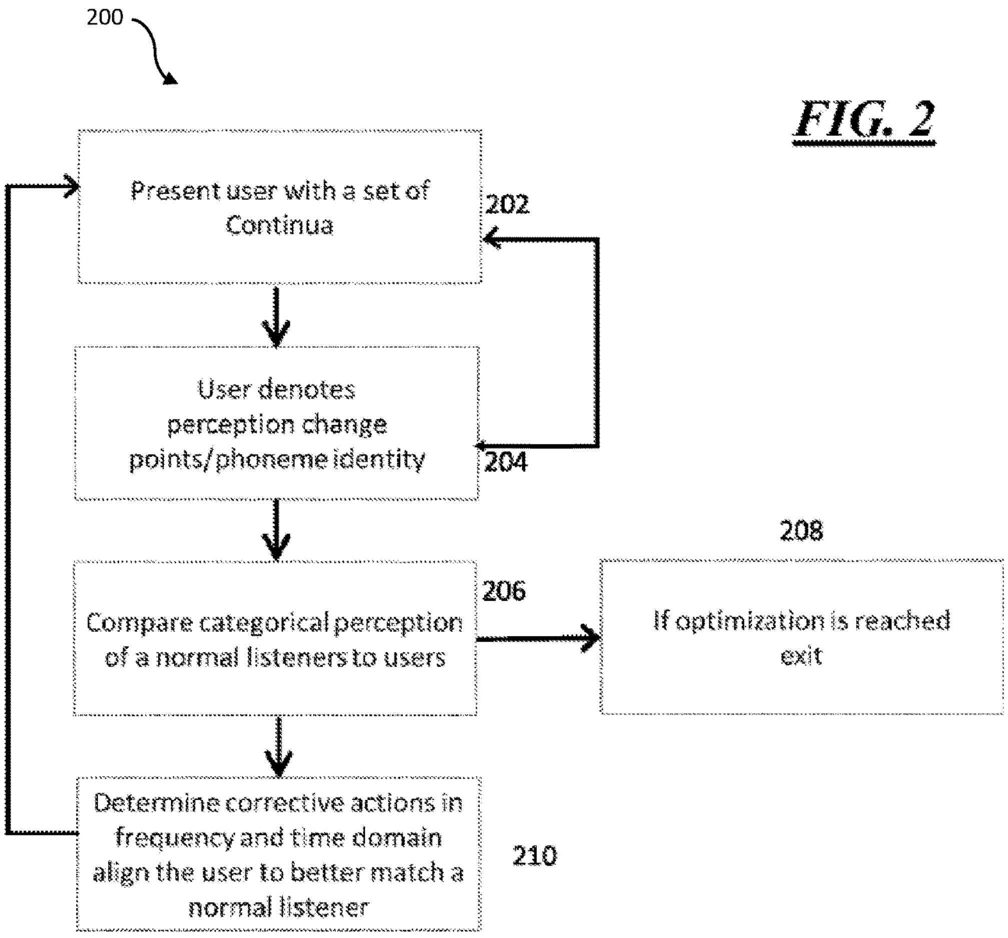
FIG. 2 is a flow diagram illustrating operations for optimizing a hearing device using categorical perception according to an embodiment of the present disclosure.

FIG. 2 illustrates a method for optimizing hearing device performance using categorical perception as the metric of optimization according to one or more embodiments of the present disclosure. The method 200 begins at operation 202 in which a set of at least one continua is presented to the user. For example, the set of continua may include at least one sound file that represent a continua from 'p' to 'b'. This set can represent one or more speakers and include items with and without background noise. In one embodiment, at least one continua from the set of continua will be presented to the user.

Method 200 continues to operation 204 in which the user interacts with the system to identify a change in the continua. The change in continua can be viewed as a breakpoint. In one embodiment, this interaction can be viewed as identifying the breakpoints in the continua that represents the categorical perception of the continua by that particular user. In one embodiment, the user can denote the change through an easy to use interface that allows the user to determine when the sound changes categorically. In another embodiment, the "same or different" test can be used. If the breakpoints are not identified through interaction 204 then another signal is presented to the user as outlined in step 202.

After a complete set of continua breakpoints are determined for the user, the method 200 continues with operation 206 to compare a normal user's categorical perceptions with that of the particular user being tested. In one embodiment, the comparison is based on the location and slope of the breakpoints that have been calculated. For example, the slope can be determined by finding the break point in each of the directions of the continua 'p' to 'b' and 'b' to 'p'. In another embodiment, the slope can be calculated by plotting the user's response to every signal in the continua. In comparing the categorical perception of a normal listener to the categorical perception of the user under examination, the data provides an accurate representation of the hearing issues for the user under examination that need to be addressed. In another embodiment, the variability in the phoneme identification data, particularly at or near the boundary of two phoneme categories, can be calculated. One of the key benefits of the inventive method is the speed in which the hearing issues for a particular user can be identified.

Method 200 concludes with step 208 if it is determined that optimization has been reached based on any of a number of criteria. In one embodiment, optimization is reached if no difference in categorical perception remains between the hearing of the user under examination and a normal listener's baseline hearing. In another embodiment, optimization is reached based on a maximum continua presented.

If optimization is not reached, then the method 200 continues with operation 210, where the results of the categorical perception data are processed to determine the ideal configuration for the hearing device to correct the issues identified with the hearing of the user under examination. In one embodiment, the ideal hearing device settings can be determined based on constraints derived from hearing experts and actual test results. In a second embodiment, those settings can be determined using graph theory to identify settings for users with similar hearing issues. In a third embodiment, ensemble learning can be used to determine the ideal configuration of the hearing device for a particular user.

Figure 3:
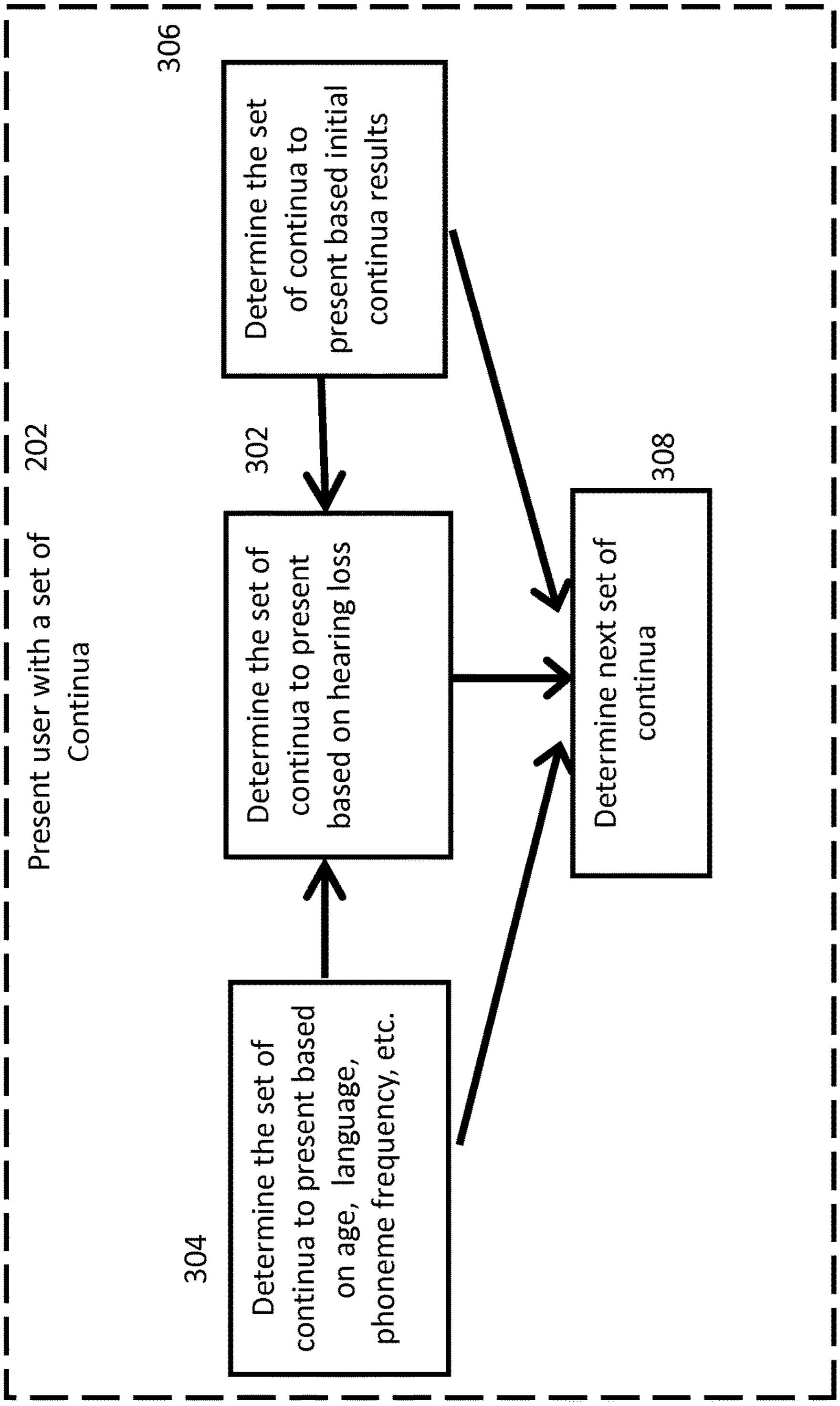
FIG. 3 is a flow diagram expanding on the presenting of users with a set of continua 202 identified in FIG. 2.

FIG. 3 expands on the determining of the set of continua 202 to present to the user based on available information for determining the most effective set of continua to identify issues with the user's hearing loss. The set of continua will be designed to elicit the user's categorical perception as discussed above. In addition, each continua can be presented with or without background noise and can be modeled to use the speech of one or more speakers.

One method for generating the continua 302 will leverage any information that provides an indication of the user's hearing loss and can include an audiogram, Fletcher index, volume level on the user's cell phone, hearing screening results, etc. Another method for generating the continua 304 is focused on determining the weighting of the continua based on the user's age, the user's primary language, or both. Yet another method for generating the continua 306 takes into account the user's performance on categorical perception testing to determine areas that need additional optimization. Still another method for generating the continua 308 takes into account the weighting adjustments to determine the next set of continua to present to the user.

Figure 4:
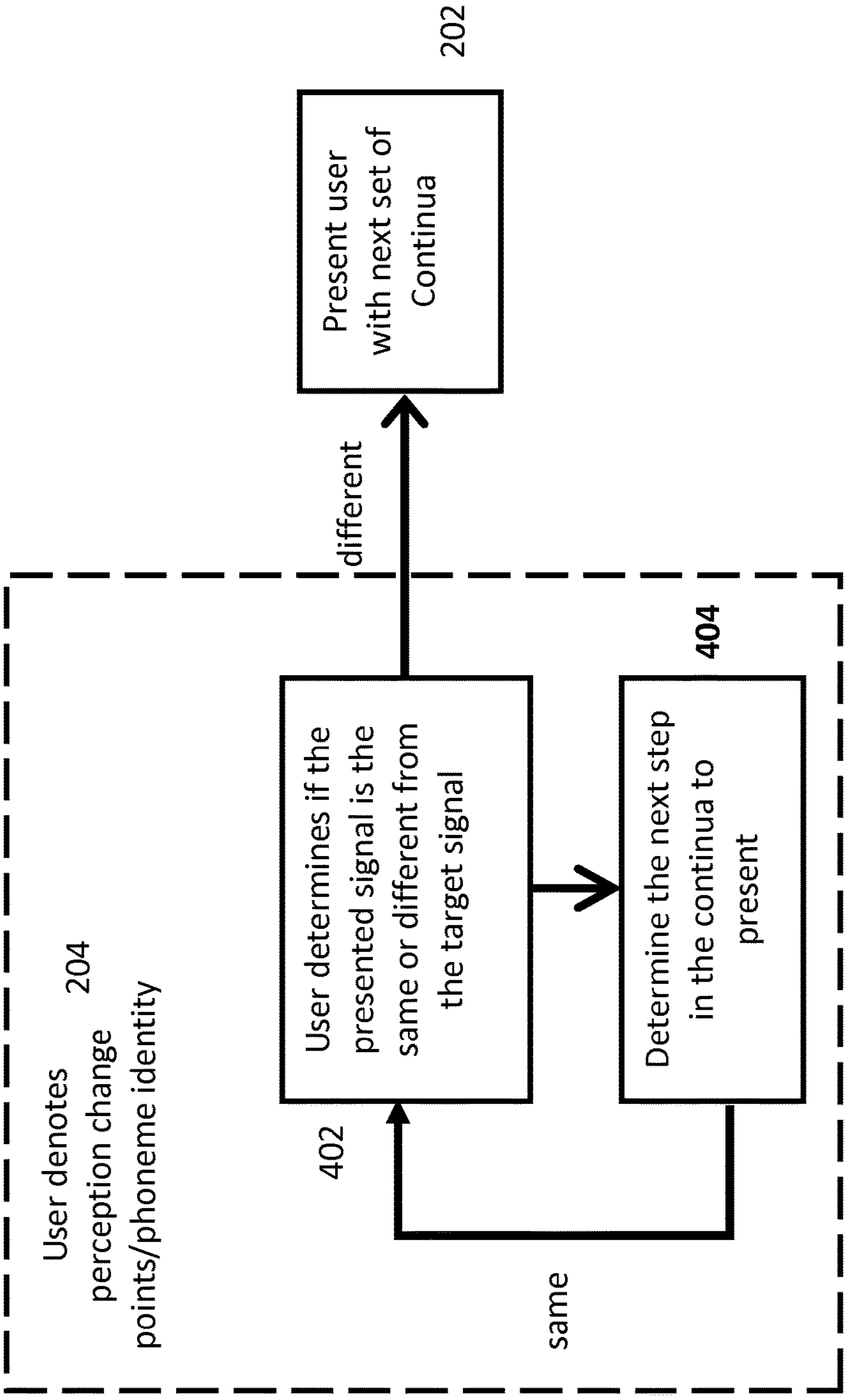
FIG. 4 is a flow diagram expanding on the user's interaction with the system 204 to denote perception change points identified in FIG. 2.

FIG. 4 expands on the user's interaction with the system 204 to denote a change in the user's categorical perception. There are a wide number of signals that can be presented to the user, from a single phoneme or word to a series of phoneme and words that the user repeats. For instance, the user could be presented with the series (b,b,b,p,p,p) and the user responds with how they perceive the signal. It should be noted that the signal can be sent as a pre-recorded set or generated or modified as it is presented to the user. Method 402 provides an interface of some kind to the user; by interacting with the interface the system can determine the breakpoints associated with the user's categorical perception of the signal. In one embodiment, the user will interact with sliders that represent a single or multiple continua to indicate the user's perception of the signal. If the interaction indicates that the user's breakpoint is found, then the method returns to 202 to determine the next continua to present to confirm the breakpoint or to identify a new breakpoint. If a breakpoint is not found, then the next step in the continua to present to the user is determined 404. For example, in one embodiment the next step in the continua is presented; another embodiment could try and predict the next breakpoint based on historical data. Still another embodiment could focus on maximum coverage across the continua. In yet another embodiment, the next step in the continua could be determined by the user's actions. Once the step size is determined, the next signal in the continua is presented to the user 402 and the process repeats until the next continua is presented to the user 202.

Figure 5:
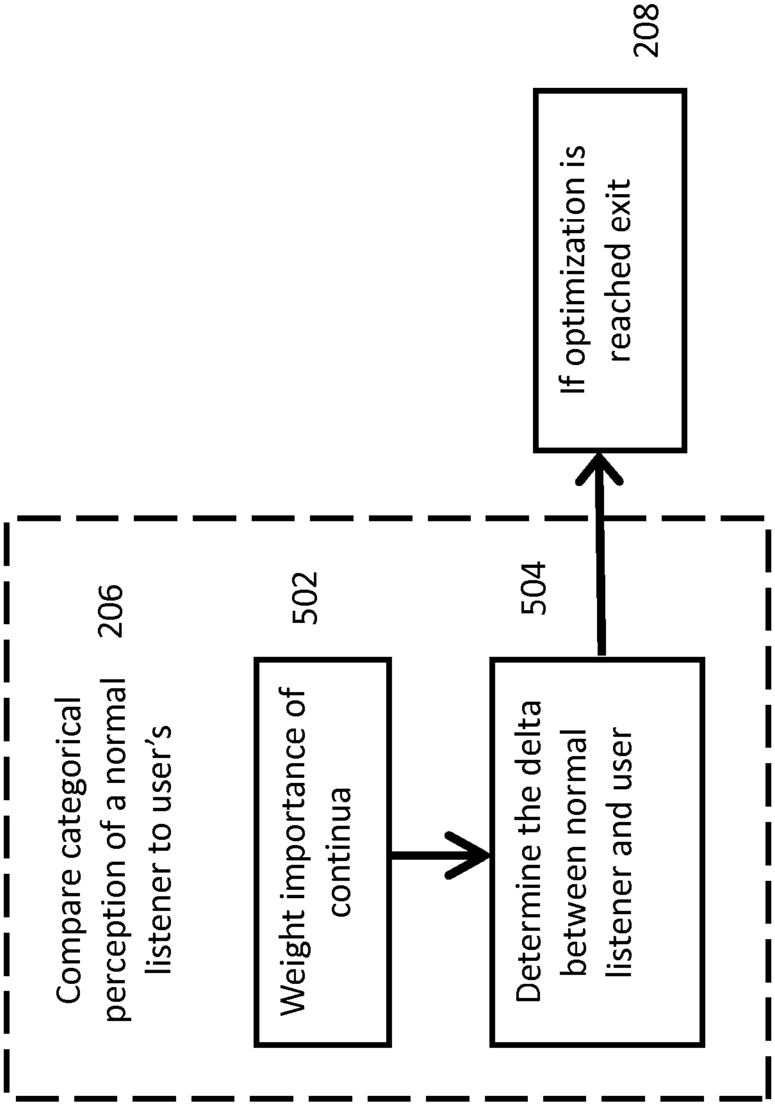
FIG. 5 is a flow diagram expanding on the comparison of the categorical perception of a normal listener to a particular user 206 identified in FIG. 2.

FIG. 5 expands on the comparison of the user's categorical perception of the signal to that of a normal listener or a group of several listeners 206. This step represents the computation of the metric of optimization. Method 502 determines the importance of each of the continua based on at least one criteria. For example, value of the pair, how often the pair is presented, and the response time of the user. Since the number of continua is variable, the weighting is often determined before proceeding to method 504. Method 504 focuses on at least one dimension of categorical perception, for example, time domain, frequency domain, user response time, repeatability of results, etc. Each dimension will have at least one criteria used to describe the delta between the user's categorical perception of the signal and that of a control value, such as an average listener or group of listeners. In one embodiment, the comparison could be achieved by comparing models of the categorical perception of the user and that of a normal listener; in another it could be represented as a shift in frequency of the breakpoint between the categorical perception of the user and that of a normal listener. In another. it could be the difference in response time between the user and a normal listener. Each dimension of categorical perception will represent the challenges the user faces associated with distinguishing the presented signals.

In addition to fitting hearing devices, the general concept of categorical perception may also be used for rehabilitation or for optimizing other treatment procedures for loss of hearing. For example, the concepts described here may be used to identify phoneme contrasts that could serve as the focus of surgical, behavioral or pharmacological treatments. In exemplary embodiment, the categorical perception tests may be used to identify patterns of acoustic contrasts that are difficult to for a user to discriminate. These contrasts may then be subject to a behavioral training regimen (e.g., using principles of neuroplasticity) or to pharmacological treatments (e.g. neuroprotective and neuroregenerative drugs), or used to improve outcomes of current and novel surgical intervention techniques (e.g. precise identification of the location of surgical implants such as those in the brainstem, or for fine tuning the design and characteristics of such implants).

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A computer-implemented method for tuning a hearing device, the method comprising:

synthesizing, using a computing device, at least a first speech stimulus and a second speech stimulus, the first speech stimulus and the second speech stimulus being selected so as to fall in different phonemic categories on either side of an expected categorical perception breakpoint;

presenting, using a hearing device, the first speech stimulus and the second speech stimulus to a listener;

receiving, using a user interface, a response from the listener for the first speech stimulus and the second speech stimulus indicating whether the first speech stimulus and the second speech stimulus are perceived to be the same or different from each other, wherein an indication of difference indicates at least one characteristic of a listener's categorical perception;

comparing, using the computing device, the at least one characteristic of the listener's categorical perception against at least one characteristic of the expected categorical breakpoint;

applying, by the computing device, at least one algorithm selected from the group consisting of regression, constraint-based reasoning, graph theory, and ensemble learning to a result of the comparison of the at least one characteristic of the listener's categorical perception against the at least one characteristic of the expected categorical breakpoint to generate at least one parameter for adjusting the hearing device; and adjusting, using the computing device, a hearing device based on the at least one generated parameter.

2. The method of claim 1 wherein the first speech stimulus and second speech stimulus are selected from the group consisting of stimuli that vary in: the time domain, the frequency-domain, voice onset time, spectral center of gravity, stop burst frequency, spectral slope, duration, rise time, spectrum moments, fall time, signal-to-noise ratio, spectral characteristics, waveform characteristics, and parameters derived from any of the foregoing.

3. The method of claim 1 further comprising:

synthesizing at least a third speech stimulus and a fourth speech stimulus upon the computing device receiving a response indicating the first speech stimulus and the second speech stimulus are perceived to be different, and presenting the third speech stimulus and the fourth speech stimulus using the hearing device.

4. The method of claim 1 wherein synthesizing at least the first speech stimulus and the second speech stimulus includes leveraging at least one of an audiogram, Fletcher index, hearing screening results, and user device volume.

5. The method of claim 1 wherein comparing the at least one characteristic of the listener's categorical perception against the at least one characteristic of the expected categorical breakpoint includes comparing a shift in frequency of the perceived categorical breakpoint and a shift in frequency of the expected categorical breakpoint.

6. The method of claim 1 further comprising assigning a weight to each of the at least one generated parameter for adjusting the hearing device.

7. The method of claim 6 wherein the weight is based on at least one of the user's age and the user's primary language.

8. The method of claim 6 further comprising synthesizing at least a third speech stimulus and a fourth speech stimulus.

9. The method of claim 1 further comprising repeating the steps of:

synthesizing the first speech stimulus and the second speech stimulus, presenting the first speech stimulus and the second speech stimulus, receiving a response for the first speech stimulus and the second speech stimulus, comparing the at least one characteristic of the listener's categorical perception against at least one characteristic of the expected categorical breakpoint, generating the at least one parameter until at least one predetermined criteria is achieved; and adjusting, using the computing device, the hearing device based on the at least one generated parameter.

10. The method of claim 9 wherein the predetermined criteria includes at least one of a listener performance metric, a temporal duration metric for completing a categorical perception test, and a number of stimuli tested.

11. The method of claim 1 wherein the at least one characteristic of the listener's categorical perception relates to a slope associated with multiple detected categorical perception judgments.

12. The method of claim 1 wherein the at least one characteristic of the listener's categorical perception relates to a mid-point between multiple detected categorical perception judgments.

* * * * *